United States Patent [19]
Bennett et al.

[11] Patent Number: 6,017,043
[45] Date of Patent: Jan. 25, 2000

[54] STORABLE TOBOGGAN

[75] Inventors: Tom B. Bennett; Greg Floyd; Kevin Rausch, all of Wooster, Ohio; Charles E. Wagner, Mulvane, Kans.

[73] Assignee: Rubbermaid Specialty Inc., Wooster, Ohio

[21] Appl. No.: 08/781,823

[22] Filed: Jan. 10, 1997

[51] Int. Cl.$^7$ .......................... B62B 13/16; B62B 15/00
[52] U.S. Cl. ............................................ 280/18; 280/845
[58] Field of Search ................................. 280/18, 22, 20, 280/14.1, 603, 845, 15

[56] References Cited

U.S. PATENT DOCUMENTS

| | | | |
|---|---|---|---|
| D. 139,386 | 11/1944 | Worden | 280/18 |
| 367,279 | 7/1887 | Emerson | 280/18 |
| 964,809 | 7/1910 | Quackenbush | 280/18 |
| 2,195,553 | 4/1940 | Bartlett | 280/18 |
| 2,219,905 | 10/1940 | Prickman | 280/12 |
| 2,241,733 | 5/1941 | Perry | 280/18 |
| 2,464,016 | 3/1949 | Berg | 280/18 |
| 2,466,547 | 4/1949 | Juntunen | 280/18 |
| 2,627,422 | 2/1953 | Pagelkopf | 280/18 |
| 2,677,159 | 5/1954 | Berg | 280/18 |
| 2,677,551 | 5/1954 | Berg | 280/18 |
| 3,034,799 | 5/1962 | Conover | 280/18 |
| 3,140,878 | 7/1964 | Davis | 280/18 |
| 3,199,888 | 8/1965 | Rowland | 280/18 |
| 3,319,972 | 5/1967 | Gallaher | 280/18 |
| 3,432,181 | 3/1969 | McKee | 280/18 |
| 3,432,182 | 3/1969 | Solipasso | 280/18 |
| 3,625,533 | 12/1971 | Boe | 280/18 |
| 3,666,282 | 5/1972 | Buening et al. | 280/18 |
| 3,799,566 | 3/1974 | Thompson | 280/18 |
| 3,884,490 | 5/1975 | Hellman | 280/18 |
| 3,982,748 | 9/1976 | Hooper et al. | 280/18 |
| 4,262,919 | 4/1981 | Krent | 280/16 |
| 4,451,032 | 5/1984 | van Olst | 272/56.5 SS |
| 5,246,401 | 9/1993 | Boatwright | 472/116 |

*Primary Examiner*—Paul N. Dickson
*Assistant Examiner*—Bridget Avery
*Attorney, Agent, or Firm*—Renner, Kenner, Greive, Bobak, Taylor & Weber

[57] ABSTRACT

A toboggan (10) includes a front section (30) that is selectively connectable to a rear section (32) by a connector (34). The connector (34) includes a plurality of laterally spaced and vertically offset tenons (70) that are carried by the front section (30) and a plurality of corresponding mortises (72) that are carried by rear section (32). A pair of bolts (80) removably extend through sections (30, 32). The forward portion of front section (30) is selectively configurable into a forward curved portion (12). Forward curved portion (12) is held in a curved configuration by a rope (36) that extends about the perimeter of toboggan (10), through a plurality of channels (50). Each end (52, 54) of the rope (36) has a knot (56, 58) that is selectively retained by a slotted knot retainer (60) carried by the front section (30). When the rope (36) is disconnected from the knot retainers (60), the front section (30) returns to its normal flat configuration. The toboggan (10) may be folded into a compact form by removing the bolts (80) and disconnecting the connector (34). The sections (30, 32) may then be folded over on top of each other.

8 Claims, 2 Drawing Sheets

STORABLE TOBOGGAN

TECHNICAL FIELD

This invention relates generally to land vehicles and in particular to a runner vehicle such as a toboggan that has at least one surface that slidably engages the terrain over which the vehicle moves. More specifically, the present invention is directed toward a storable toboggan that includes two selectively connectable sections, each of which may be stored flat while one of them may be configured into a curved front portion when the toboggan is assembled.

BACKGROUND ART

Traditionally, a toboggan is a long, flat-bottomed, sled that is usually made of thin boards that curve up at one end and typically has low handrails along its sides. Toboggans are preferably designed to accommodate more than one rider and are usually configured to be long enough to carry three or more riders. As such, a toboggan is often difficult to transport and store due to its overall length and the existence of the front curved portion.

In the past, toboggans have been provided with hinged sections that fold onto each other to decrease the overall length of the toboggan for storage. Such toboggans have not, however, provided a design whereby the front curved portion may be collapsed, nor have they provided configurations where the adjacent sections may be fully detached from each other. In addition, in some of the prior designs which utilized hinges, the toboggan was allowed to pivot about the hinges while in use, thus degrading the quality and comfort of the toboggan ride.

Thus, it is desirable to provide a toboggan that overcomes the deficiencies in the prior art by providing a toboggan that may be broken down into multiple sections and which may also have a front portion that may be selectively configurable to be either flat or curved so that the toboggan is easily storable.

DISCLOSURE OF THE INVENTION

It is thus an object of the present invention to provide a toboggan that may be broken down into multiple sections so that it may be easily stored.

It is another object of the present invention to provide a toboggan, as above, that includes a front section and a rear section that may be selectively connected by a plurality of interlocking tenons and mortises and a plurality of bolts.

It is a further object of the present invention to provide a toboggan, as above, in which the tenon and mortise configuration that minimizes the shear stress on the bolts.

It is yet another object of the present invention to provide a toboggan, as above, that provides an additional connection between the front section and the rear section which also assists in minimizing the shear stress experienced by the bolts.

It is still a further object of the present invention to provide a toboggan, as above, in which the front section may be selectively configured into a forward curved position.

It is an additional object of the present invention to provide a toboggan, as above, in which the front section includes a plurality of arcuate segments that are connected by integral hinges.

It is another object of the present invention to provide a toboggan, as above, that includes at least one rope that selectively retains the front section in the curved configuration.

It is still another object of the present invention to provide a toboggan, as above, that includes a pair of slotted knot retainers that retain knots formed in the rope to hold the front section in the curved configuration.

These and other objects of the present invention, which will become apparent from the description to follow, are accomplished by the improvements hereinafter described and claimed.

In general, a toboggan includes a front section, a rear section, and means to selectively connect the front section to the rear section, the front section having a forward portion that may be selectively configurable to have a curved forward end.

A preferred exemplary storable toboggan incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
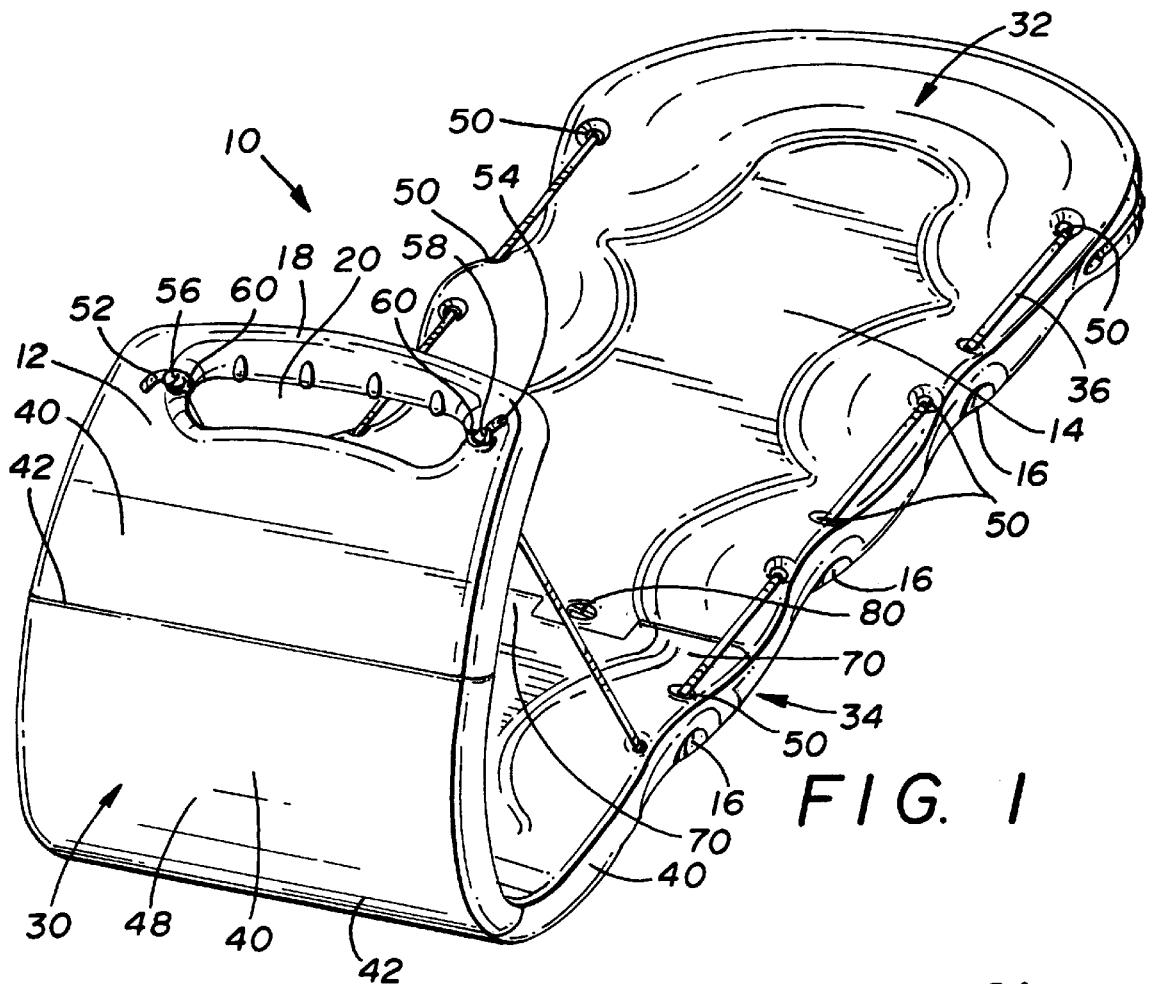
FIG. 1 is a perspective view of an assembled toboggan made in accordance with the concepts of the present invention.

A toboggan made in accordance with the concepts of the present invention is indicated generally by the numeral 10 in the accompanying drawings. When assembled for use, toboggan 10 generally includes a forward curved portion 12 that is connected to an elongate, relatively flat seat portion 14. A plurality of handholds 16 are formed in the sides of seat portion 14 so that people riding toboggan 10 may grasp handholds 16 for support. Additionally, a front handle 18 is formed in the top of forward curved portion 12 by providing an arcuate opening 20 in forward portion 12. Toboggan 10 may be fabricated from any of a variety of materials, but it has been found that it is desirable to fabricate toboggan 10 from polyethylene.

Figure 2:
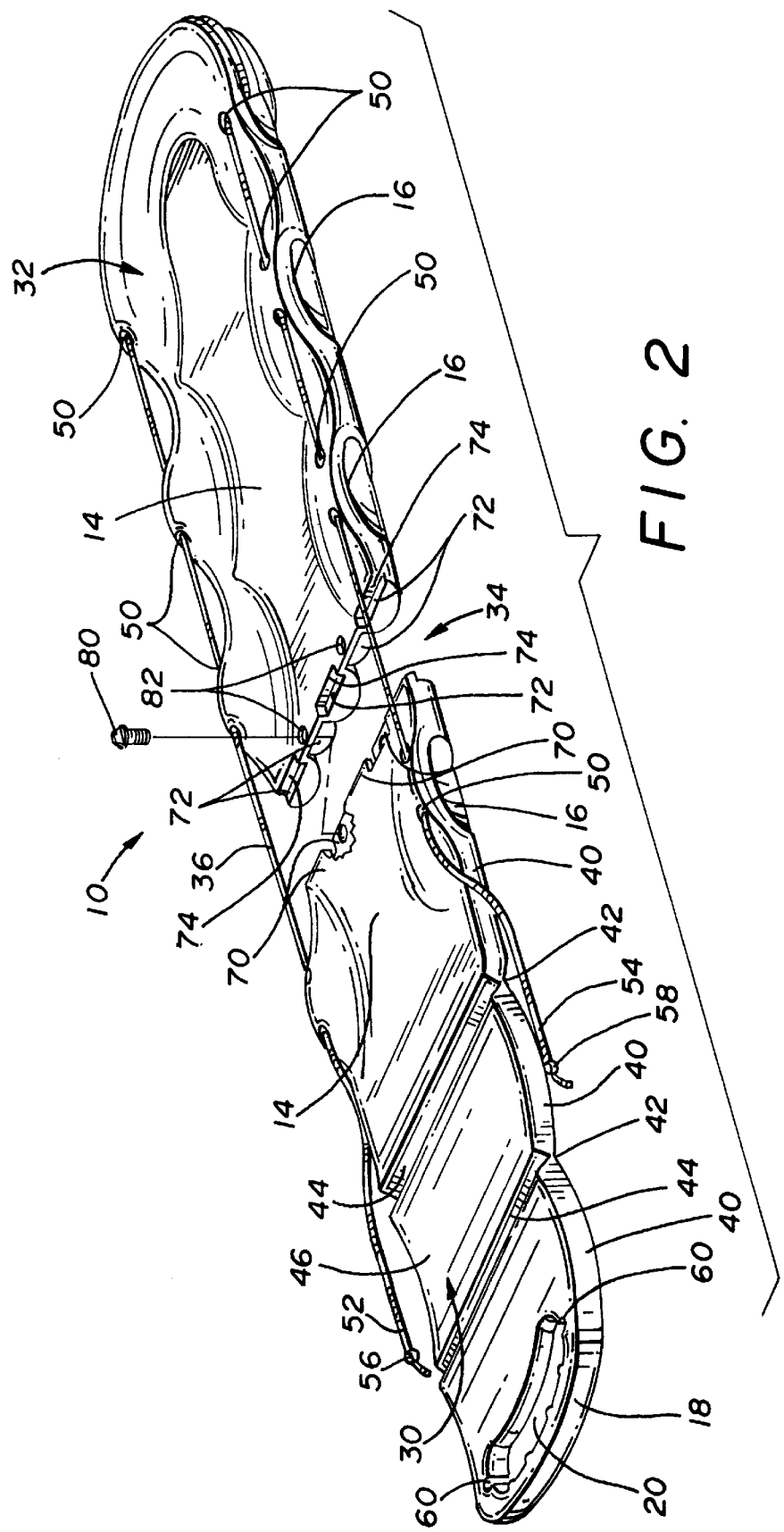
FIG. 2 is a perspective view of the toboggan of FIG. 1 shown in a disassembled condition.

Toboggan 10 includes a front section 30 and a rear section 32 that are selectively connected by a connector assembly generally indicated by the numeral 34 and a rope 36. Although rope 36 assists in holding toboggan 10 together, front section 30 and rear section 32 are held together primarily by connector assembly 34 as will be more fully hereinafter described. When toboggan 10 is being transported or stored, front section 30 and rear section 32 may be separated as depicted in FIG. 2. When separated, sections 30, 32 may be stacked on top of each other by folding one section over the other. Sections 30, 32 may be easily stacked because forward curved portion 12 becomes flat when toboggan 10 is disassembled. As such, toboggan 10 may be folded into a relatively compact body that is easy to transport and store.

Front section 30 includes forward curved portion 12 as well as a part of flat seat portion 14. Front section 30 includes a plurality of joined segments 40 that are configured to form forward curved portion 12. As may be seen in FIG. 2, each segment 40 is somewhat arcuate so that forward curved portion 12 has a continuous arc when segments 40 are configured to form forward curved portion 12. In the preferred embodiment of the present invention, front section 30 includes three segments 40. Each segment 40 is joined to another by a continuous hinge 42 that may be formed in front section 30 by providing V-shaped slots 44 therein so that a thin piece of flexible material remains between adjacent segments 40. It is desirable to form slots 44 in the top surface 46 of front section 30 so that bottom surface 48 remains smooth when toboggan 10 is assembled. The specific configuration of hinges 42 as well as the number of segments 40 may differ without departing from the spirit of the present invention.

As previously described, toboggan 10 is held in the assembled position through the cooperation of rope 36 and connector 34. Rope 36 is carried by toboggan 10 by being threaded through a plurality of channels 50 that are dispersed around the majority of the perimeter of toboggan 10 and formed generally above each handhold 16. Channels 50 may be integrally formed in the walls of toboggan 10 or may be formed separately and attached to toboggan 10 by suitable connectors. Rope 36 is slidingly received in each channel 50 and extends around the back of rear section 32. Each end 52, 54 of rope 50 is knotted, as at knots 56, 58 so that rope 50 cannot come out of channels 50. Thus, rope 36 prevents front section 30 and rear section 32 from being completely separated from each other. Of course, rather than knots 56, 58, any type of stop or enlargement could be formed at the end of rope 50 without departing from the concepts of the present invention.

Figure 3:
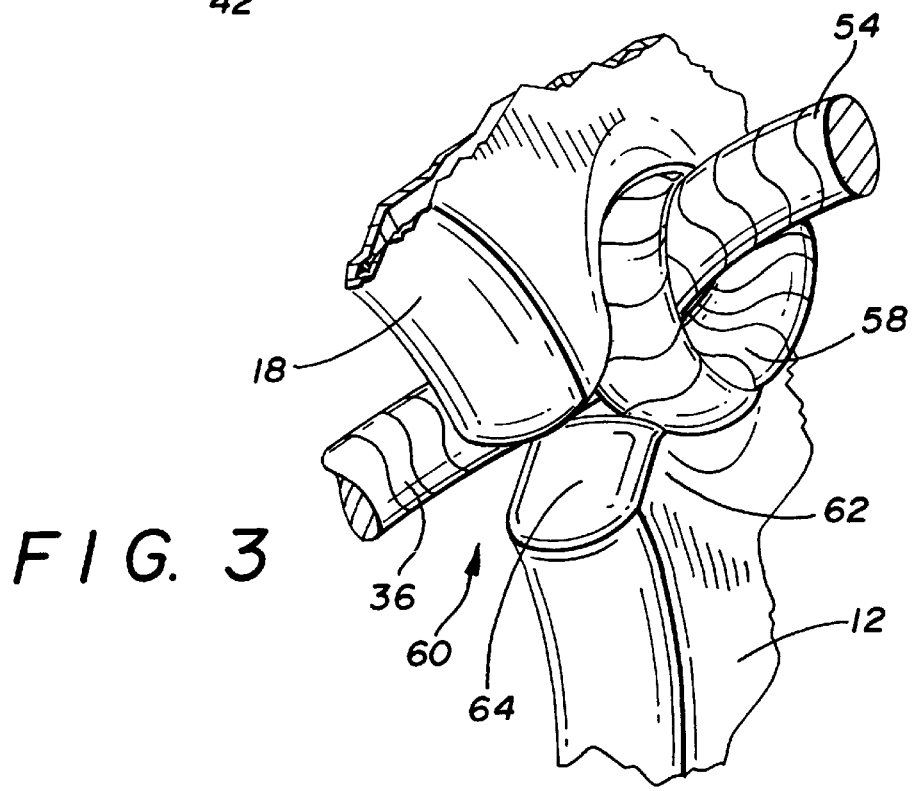
FIG. 3 is an enlarged fragmented view of one of the slotted knot retainers holding a knotted end of the rope.

When toboggan 10 is disassembled, rope ends 52, 54 hang freely, as shown in FIG. 2. However, when toboggan 10 is assembled, rope 36 is used to hold forward portion 12 in the curved configuration, as shown in FIG. 1. Rope 36 holds forward curved portion 12 through the engagement of rope 36 with a pair of slotted knot retainers generally indicated by the numeral 60. Knot retainers 60 are formed in a side wall of handle opening 20 and, as shown in FIG. 3, each has a bowl-shaped opening 62 which is accessed to handle opening 20 by a slot 64. Each slot 64 is just wide enough to allow rope 36 to fit through slot 64 and into bowl-shaped opening 62. Each opening 62 is small enough to prevent knots 56, 58 from pulling through opening 62. Furthermore, the length of rope 36 is sized such that front section 30 must be rolled up into a curved configuration in order for the knotted ends 52, 54 to be able to reach knot retainers 60. Thus, when knotted ends 52, 54 are held by retainers 60, rope 36 is taut and front section 30 is forced to take on forward curved portion 12.

In addition to the connection formed by rope 36 between front section 30 and rear section 32, connector 34 also provides a selective connection between sections 30, 32. Numerous types of connectors 34 could be used to connect front section 30 to rear section 32. In the preferred embodiment of the present invention, front section 30 carries a plurality of laterally spaced, vertically offset tenons 70 while rear section 32 carries a plurality of corresponding mortises 72. Each tenon 70 has a substantially rectangular cross section that snugly fits into its corresponding mortise 72 to provide a relatively tight fit between front section 30 and rear section 32. As can be seen in FIG. 2, the alternating, vertically offset configuration of tenons 70 and mortises 72 prevent front section 30 and rear section 32 from moving vertically with respect to each other when they are connected. In addition, because tenons 70 extend into rear section 32, sections 30, 32 are substantially prevented from moving laterally with respect to each other. In the preferred embodiment of the present invention, tenons 70 extend approximately two to six inches into rear section 32 when sections 30, 32 are assembled. The rear walls 74 of mortises 72 similarly prevent tenons 70 and thus front section 32 from moving rearwardly into rear section 32.

A plurality of pins or bolts 80 extend through rear section 32 and front section 30 to keep sections 30, 32 from separating. Due to the intended use of toboggan 10, it is desirable to provide a configuration 34 that minimizes the forces experienced by bolts 80 while toboggan 10 is in use. As such, tenons 70 and mortises 72 are configured to absorb a portion of the forces acting to separate sections 30, 32. As previously described, tenons 70 and mortises 72 are vertically offset and thus absorb most of the vertical forces. Similarly, lateral forces are withstood because tenons 70 extend into rear section 32. Rearward longitudinal forces are counteracted by rear wall 74 of mortises 72. Forward longitudinal forces are somewhat counteracted by rope 36 because rope 36 tends to pull sections 30, 32 together when toboggan 10 is assembled. All of the above features function to reduce shear stress felt by bolts 80 when toboggan 10 is assembled. By reducing the shear stresses experienced by bolts 80 as well as other forces, the useful life of bolts 80 may be extended. Bolts 80 are held in place by any of various known means. For instance, bolts 80 may be threaded into threaded holes 82 that pass through both sections 30, 32. Bolts 80 may also be snap-fit between sections 30, 32. Generally, bolts 80 may be held by sections 30, 32 in any known manner so long as a tight fit between sections 30, 32 is maintained and bolts 80 do not protrude through bottom surface 48 of toboggan 10.1 Moreover, bolts 80 are preferably countersunk in holes 82 to provide a smooth, unobstructed seat portion 14. In addition, bolts 80 could be used to connect front section 30 and rear section 32 in a folded-over position by providing bolt holes in opposed areas of sections 30, 32. In such a configuration, sections 30, 32 and bolts 80 would not be loose while toboggan 10 was being stored or transported.

Toboggan 10 is assembled by first connecting interlocking tenons 70 and mortises 72 and inserting bolts 80 as previously described. Once front 30 and rear 32 sections are connected, knotted ends 52, 54 of rope 36 are connected to front section 30 to form forward curved portion 12. To connect rope 36, the user first grasps front section 30 by handle 18 and configures front section 30 into forward curved portion 12. The user then inserts each knotted end 52, 54 into its respective slotted knot retainer 60 and releases handle 18. Once assembled, toboggan 10 may be used and then disassembled for storage or travel. To disassemble, the user first removes rope ends 52, 54 from retainer 60 causing front section 30 to assume a flat configuration. The user then removes bolts 80 and pulls tenons 70 out of mortises 72 to separate sections 30, 32. In this state, toboggan 10 may be folded upon itself by placing front section 30 over rear section 32 to provide a compact configuration as previously described.

It is also contemplated by the present invention to provide rear sections 32 having different lengths that may be used to create toboggans 10 of various lengths. In addition, an intermediate section could be provided that would be positionable between front section 30 and rear section 32 to extend the length of toboggan 10.

It should thus be evident that a storable toboggan made in accordance with the concepts of the present invention accomplishes the objects of the present invention and otherwise substantially improves the toboggan art.

What is claimed is:

1. A toboggan comprising a front section, a rear section, a plurality of vertically offset tenons carried by one of said sections, a plurality of mortises carried by the other of said sections and being configured to receive said tenons in an overlapping fashion, and a connector holding said tenons in said mortises to connect said front and rear sections.

2. A toboggan according to claim 1 further comprising additional means to connect said front section to said rear section.

3. A toboggan according to claim 2 wherein said additional means to connect includes a rope connected to said rear section and said front section.

4. A toboggan according to claim 1 wherein said connector includes at least one bolt.

5. A toboggan according to claim 1 wherein said front section is selectively configurable to have a curved front end.

6. A toboggan comprising a front section, a rear section, said front section having a forward portion including a plurality of at least partially arcuate segments, said forward portion having a horizontally elongated handle hole, said handle hole having two ends, knot retainers formed in said forward portion adjacent to said handle hole ends, said knot retainers including openings extending through said forward portion and slots between said handle hole and said opening, said front section and said rear section having a plurality of channels, a plurality of vertically offset tenons carried by one of said sections and a plurality of mortises carried by the other of said sections and being configured to receive said tenons, at least one member to hold said tenons in said mortises, and a rope selectively connecting said front section to said rear section which passes through said channels and terminates in two knotted ends, said rope being selectively connectable to said forward portion and said knot retainers to hold said forward portion in a curved configuration.

7. A toboggan comprising a seat portion and a forward portion adjacent to said seat portion, said forward portion being selectively configurable to have a curved forward end, said forward portion including a plurality of at least partially arcuate segments which when configured to form said curved forward end form a continuous arc; a rope connected to said seat portion and selectively attachable to said forward portion, wherein said rope has two ends, a knot formed on each of said ends, said forward portion having a pair of knot retainers, wherein said pair of said knot retainers include bowl-shaped openings extending through said forward portion; a handle opening formed within said forward portion, wherein a slot joins said handle opening to said bowl-shaped opening in said knot retainers.

8. A toboggan according to claim 7 wherein said bowl-shaped opening is of a size larger than said slot.

* * * * *